United States Patent
Furuya

(10) Patent No.: US 9,824,654 B2
(45) Date of Patent: Nov. 21, 2017

(54) LIQUID CRYSTAL DISPLAY DEVICE

(71) Applicant: JVC KENWOOD Corporation, Yokohama-shi, Kanagawa (JP)

(72) Inventor: Masato Furuya, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 14/945,467

(22) Filed: Nov. 19, 2015

(65) Prior Publication Data
US 2016/0284298 A1 Sep. 29, 2016

(30) Foreign Application Priority Data

Mar. 25, 2015 (JP) ................. 2015-062220

(51) Int. Cl.
*G09G 3/36* (2006.01)
*G02F 1/133* (2006.01)

(52) U.S. Cl.
CPC ........... *G09G 3/3648* (2013.01); *G02F 1/133* (2013.01); *G09G 3/3696* (2013.01); *G09G 2300/0426* (2013.01); *G09G 2320/0219* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,676,921 A | * | 7/1972 | Kooi | H01L 21/32 148/DIG. 103 |
| RE31,580 E | * | 5/1984 | Kooi | H01L 21/32 257/397 |
| 6,128,215 A | * | 10/2000 | Lee | G11C 7/20 326/39 |
| 6,288,712 B1 | * | 9/2001 | Pinkham | G09G 3/3648 345/204 |
| 8,089,598 B2 | * | 1/2012 | Kim | G02F 1/136286 349/139 |
| 2002/0024054 A1 | * | 2/2002 | Koyama | G09G 3/3266 257/84 |
| 2003/0095087 A1 | * | 5/2003 | Libsch | G09G 3/3233 345/82 |

(Continued)

FOREIGN PATENT DOCUMENTS

JP 2004-125895 A 4/2004

*Primary Examiner* — Van Chow
(74) *Attorney, Agent, or Firm* — Nath, Goldberg & Meyer; Jerald L. Meyer; Stanley N. Protigal

(57) ABSTRACT

A pixel portion has a liquid crystal sandwiched between a pixel electrode and a common electrode. The liquid crystal is driven in response to a potential difference between a voltage applied to the pixel electrode and a voltage applied to the common electrode, and incident light is modulated in the liquid crystal in response to the potential difference. A drive portion has: a transistor that has a gate terminal connected to the row scanning line, is subjected to a conduction control based on a row selection signal supplied to the row scanning line, and selectively receives a pixel signal supplied to a column data line; a holding capacitance portion that holds the pixel signal selectively received from the column data line through the transistor; and a gate capacitance portion having one electrode portion connected to the gate terminal of the transistor, and the other electrode portion given a reference voltage.

7 Claims, 6 Drawing Sheets

(56) References Cited

U.S. PATENT DOCUMENTS

| | | | |
|---|---|---|---|
| 2004/0196235 A1* | 10/2004 | Koyama | G09G 3/3607 345/89 |
| 2004/0263939 A1* | 12/2004 | Yano | G09G 3/3648 359/238 |
| 2006/0181497 A1* | 8/2006 | Edo | G09G 3/3648 345/92 |
| 2008/0191989 A1* | 8/2008 | Lee | G09G 3/3688 345/98 |
| 2009/0096947 A1* | 4/2009 | Teranishi | G02F 1/13306 349/38 |
| 2014/0232706 A1* | 8/2014 | Iwasa | G02F 1/136213 345/206 |

* cited by examiner

LIQUID CRYSTAL DISPLAY DEVICE

CROSS REFERENCE TO RELATED APPLICATION

This application is based upon and claims the benefit of priority under 35 U.S.C. §119 from Japanese Patent Application No. 2015-062220, filed on Mar. 25, 2015, the entire contents of which are incorporated herein by reference.

BACKGROUND

The present disclosure relates to an active matrix-type liquid crystal display device.

As a conventional active matrix-type liquid crystal display device, the liquid crystal display device which is described in Japanese Unexamined Patent Application Publication No. 2004-125895 (Patent Document 1) is known. Patent Document 1 describes an active matrix-type liquid crystal display device in which a transistor is arranged as an active element on each crossing portion where row scanning lines and column data lines cross at right angles. The liquid crystal display device described in Patent Document 1 holds a pixel signal in a signal holding capacitor through each of the transistors, and drives a liquid crystal in accordance with the held pixel signal.

A parasitic capacitance is formed between a gate terminal and source terminal of the transistor. This parasitic capacitance varies a source voltage when the transistor shifts from a conducting state to a non-conducting state. When the source voltage of the transistor varies, a flicker, horizontal streak noise or the like become prone to occur in an event of driving the liquid crystal, and the image quality degrades.

In order to suppress such a degrading of the image quality, a capacitor is provided in a location close to an output portion of a scanning circuit that scans each of the row scanning lines in the conventional liquid crystal display device. Through this capacitor, a rise and a fall of a row selection signal given to the gate terminal of the transistor becomes gradual, and a variation of the source voltage of the transistor is suppressed.

SUMMARY

However, in accordance with such a conventional configuration in which the capacitor is provided in a location close to the output portion of the scanning circuit that scans each of the row scanning lines, it is difficult to sufficiently suppress the source voltages of a plurality of the transistors connected to the row scanning lines. Therefore, conventional liquid crystal display devices have a defect in that they are insufficient in suppressing the deterioration of the image quality caused by the flicker, the horizontal streak noise or the like.

An aspect of the embodiments provides a liquid crystal display device including: a plurality of pixel circuits arranged on respective crossing portions of a plurality of column data lines and a plurality of row scanning lines, the column data lines and the row scanning lines being perpendicular to each other; a horizontal scanning circuit that supplies pixel signals to the column data lines; and a vertical scanning circuit that supplies row selection signals to the row scanning lines, wherein each of the pixel circuits includes: a pixel portion having a liquid crystal sandwiched between a pixel electrode and a common electrode, in which the liquid crystal is driven in response to a potential difference between a voltage applied to the pixel electrode and a voltage applied to the common electrode, and incident light is modulated in the liquid crystal in response to the potential difference; and a drive portion having: a transistor that has a gate terminal connected to the row scanning line, is subjected to a conduction control based on the row selection signal supplied to the row scanning line, and selectively receives the pixel signal supplied to the column data line; a holding capacitance portion that holds the pixel signal selectively received from the column data line through the transistor; and a gate capacitance portion having one electrode portion connected to the gate terminal of the transistor, and the other electrode portion given a reference voltage, the drive portion driving the liquid crystal by applying, to the pixel electrode, a voltage corresponding to a signal voltage of the pixel signal held in the holding capacitance portion.

DETAILED DESCRIPTION

A description is made below of respective embodiments by using the drawings.

First Embodiment

Figure 1:
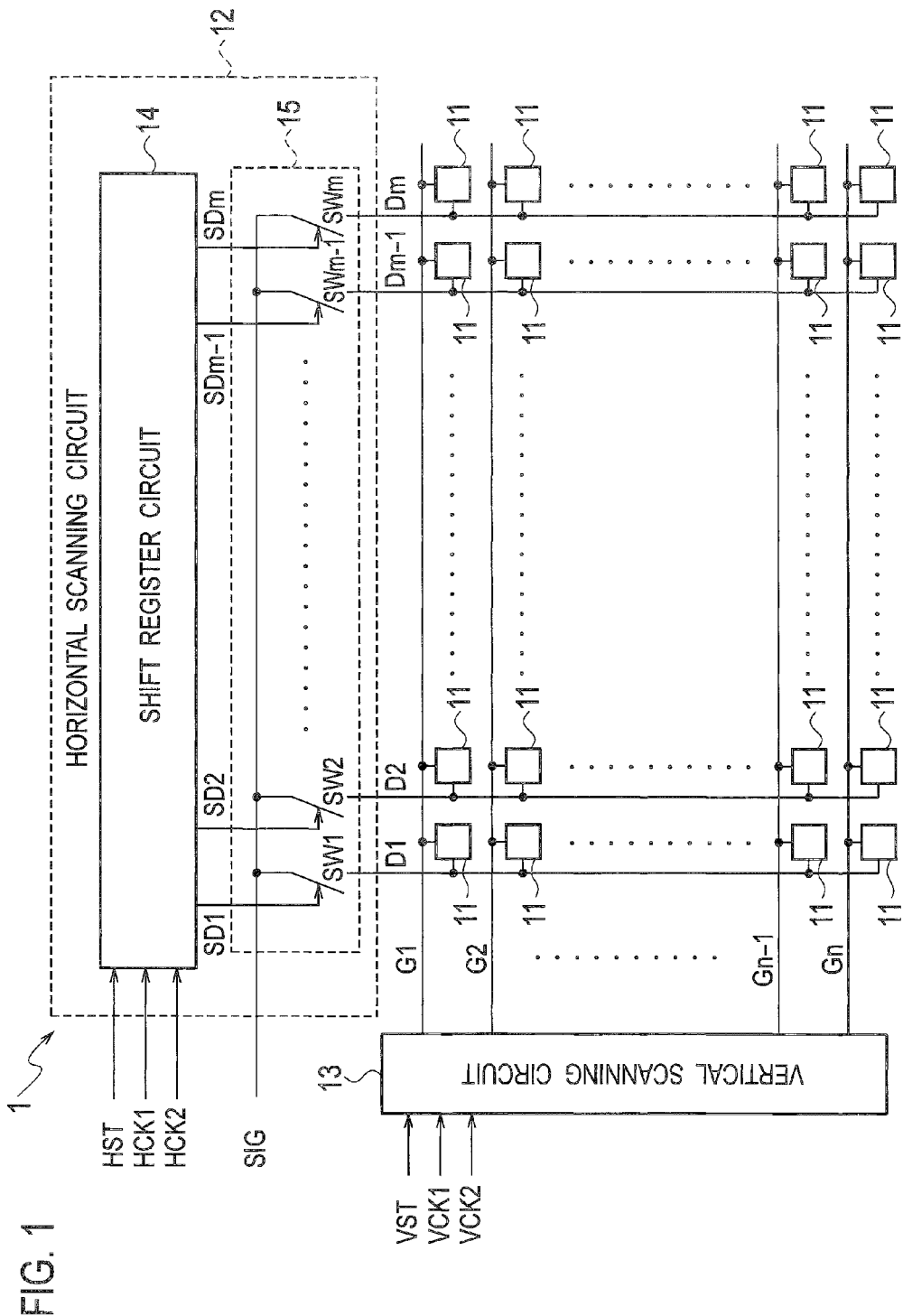
FIG. 1 is a configuration diagram showing a liquid crystal display device according to the first embodiment.

A description is made of a circuit configuration of a liquid crystal display device according to the first embodiment with reference to FIG. 1. In FIG. 1, a liquid crystal display device 1 includes pixel circuits 11, a horizontal scanning circuit 12 and a vertical scanning circuit 13.

A plurality (m×n) of the pixel circuits 11 is arranged in a matrix fashion on crossing portions of m number of column data lines (D1 to Dm) and n number of row scanning lines (G1 to Gn), which cross at right angles with each other. All of the plurality of pixel circuits 11 are configured in the same way. Hence, here, the pixel circuit 11 disposed on the crossing portion of the column data line D1 and the row scanning line G1 is taken as a representative, and a description follows of such a configuration of the pixel circuit 11 with reference to FIG. 2.

Figure 2:
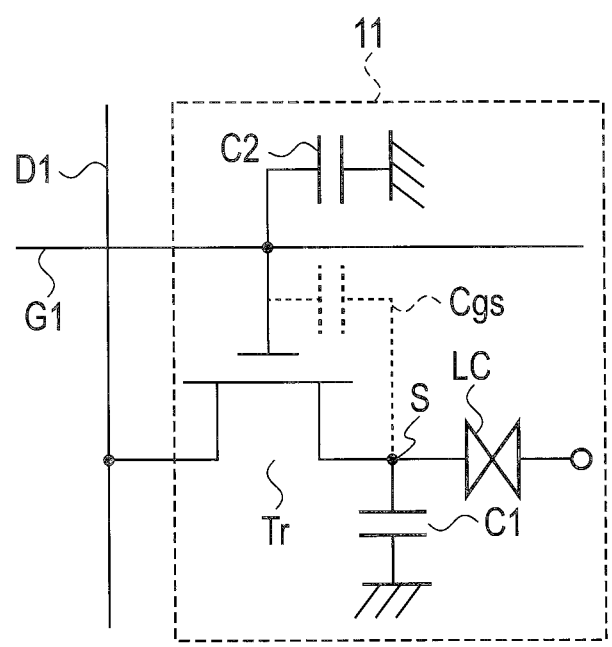
FIG. 2 is a configuration diagram showing a configuration of a pixel circuit of the liquid crystal display device according to the first embodiment.

FIG. 2 is a circuit diagram showing a circuit configuration of the pixel circuit 11. In FIG. 2 the pixel circuit 11 includes a transistor Tr, a holding capacitance portion C1, a gate capacitance portion C2, and a liquid crystal LC. Note that, with reference to FIG. 3, a description will follow later of a structure of the pixel circuit 11 in an event where the pixel circuit 11 is configured on a semiconductor substrate.

The transistor Tr is a switching transistor, and for example, is composed of an N-channel MOS-FET (field-effect transistor). In the transistor Tr, a gate terminal thereof is connected to the row scanning line G1, and a drain terminal is connected to the column data line D1. The transistor Tr is subjected to a conduction control in response to a row selection signal given to the row scanning line G1, and selectively inputs a pixel signal, which is given to the column data line D1, to the pixel circuit 11.

That is, when the row selection signal shifts from a low level to a high level, the transistor Tr shifts from a non-conducting state to a conducting state, and inputs and writes the pixel signal, which is given to the column data line D1, to the holding capacitance portion C1.

For example, the holding capacitance portion C1 is composed of a so-called MIS (Metal-Insulator-Semiconductor) structure in which an insulator (not shown) is sandwiched between one electrode portion (not shown) made of metal and the other electrode portion (not shown) made of semiconductor. Hereinafter, one electrode portion and the other electrode portion of the holding capacitance portion C1 are referred to as a first electrode portion and a second electrode portion, respectively.

In the holding capacitance portion C1, the first electrode portion is connected to a source terminal S of the transistor Tr, and the second electrode portion is connected to a reference voltage source, and the holding capacitance portion C1 is given a reference voltage. As a reference voltage source, a ground power supply is mentioned for example, and a ground potential is given to the source terminal S of the transistor Tr. The holding capacitance portion C1 holds the pixel signal selectively inputted and written through the transistor Tr.

For example, the gate capacitance portion C2 is composed of a so-called MIM (Metal-Insulator-Metal) structure in which an insulator (not shown) is sandwiched between one electrode portion (not shown) made of metal and the other electrode portion (not shown) made of metal. Hereinafter, one electrode portion and the other electrode portion of the gate capacitance portion C2 are referred to as a third electrode portion and a fourth electrode portion, respectively.

In the gate capacitance portion C2, the third electrode portion is connected to the gate terminal of the transistor Tr, and the fourth electrode portion is connected to a reference voltage source, and the gate capacitance portion C2 is given a reference voltage. As a reference voltage source, a ground power supply is mentioned for example, and a ground potential is given to the fourth electrode portion.

The gate capacitance portion C2 is a fixed capacitance connected to the gate terminal of the transistor Tr, and a capacitance value is a designed value that is set appropriately. The gate capacitance portion C2 functions as a gate additional capacitance for a gate capacitance including a parasitic capacitance connected to the transistor Tr.

The liquid crystal LC is composed by being filled and sealed between a pixel electrode (not shown) having reflectivity and a common electrode (not shown) disposed opposite to the pixel electrode so as to be spaced apart. The pixel electrode is connected to the source terminal S of the transistor Tr and the first electrode portion of the holding capacitance portion C1. The common electrode is given a common electrode voltage preset in response to a voltage of the pixel signal given to the pixel electrode.

The liquid crystal LC is driven in response to a potential difference between the voltage given to the pixel electrode in response to such a signal voltage of the pixel signal and the common electrode voltage given to the common electrode, and incident light onto the liquid crystal LC is modulated in the liquid crystal LC in response to the potential difference.

As mentioned above, the pixel circuit 11 is composed of: a pixel portion including the liquid crystal LC sandwiched between the pixel electrode and the common electrode; and a drive portion including the transistor Tr, the holding capacitance portion C1 and the gate capacitance portion C2.

Returning to FIG. 1, the horizontal scanning circuit 12 includes a shift register circuit 14 and a switch circuit 15.

To the shift register circuit 14, a horizontal synchronizing signal (HST) and horizontal scanning clock signals (HCK1, HCK2) are inputted. The shift register circuit 14 sequentially shifts clock signals based on the horizontal synchronizing signal and the horizontal scanning clock signals, and thereby generates switching signals (SD1 to SDm) in a cycle of one horizontal scanning period. The shift register circuit 14 gives the generated switching signals to the switch circuit 15.

The switch circuit 15 includes switches SW1 to SWm. The switches SW1 to SWm are controlled to an ON state or an OFF state based on the switching signals (SD1 to SDm), which correspond thereto and are given from the shift register circuit 14. The switches SW1 to SWm are provided so as to correspond to the column data lines, and sequentially input such pixel signals (SIG), which correspond to the column data lines, to the column data lines.

The switches SW1 to SWm selectively give such pixel signals, which correspond to the column data lines, to the column data lines. For example, the switch SW1 turns to the ON state when the switching signal SD1 is at the high level, selects a pixel signal corresponding to the column data line D1, and gives the selected pixel signal to the column data line D1.

To the vertical scanning circuit 13, the row scanning lines are connected. The vertical scanning circuit 13 receives a vertical synchronizing signal (VST) and vertical scanning clock signals (VCK1, VCK2). For example, based on the vertical synchronizing signal and the vertical scanning clock signals, the vertical scanning circuit 13 sequentially supplies the row selection signals from the row scanning line G1 to the row scanning line Gn in a cycle of one horizontal scanning period.

Figure 3:
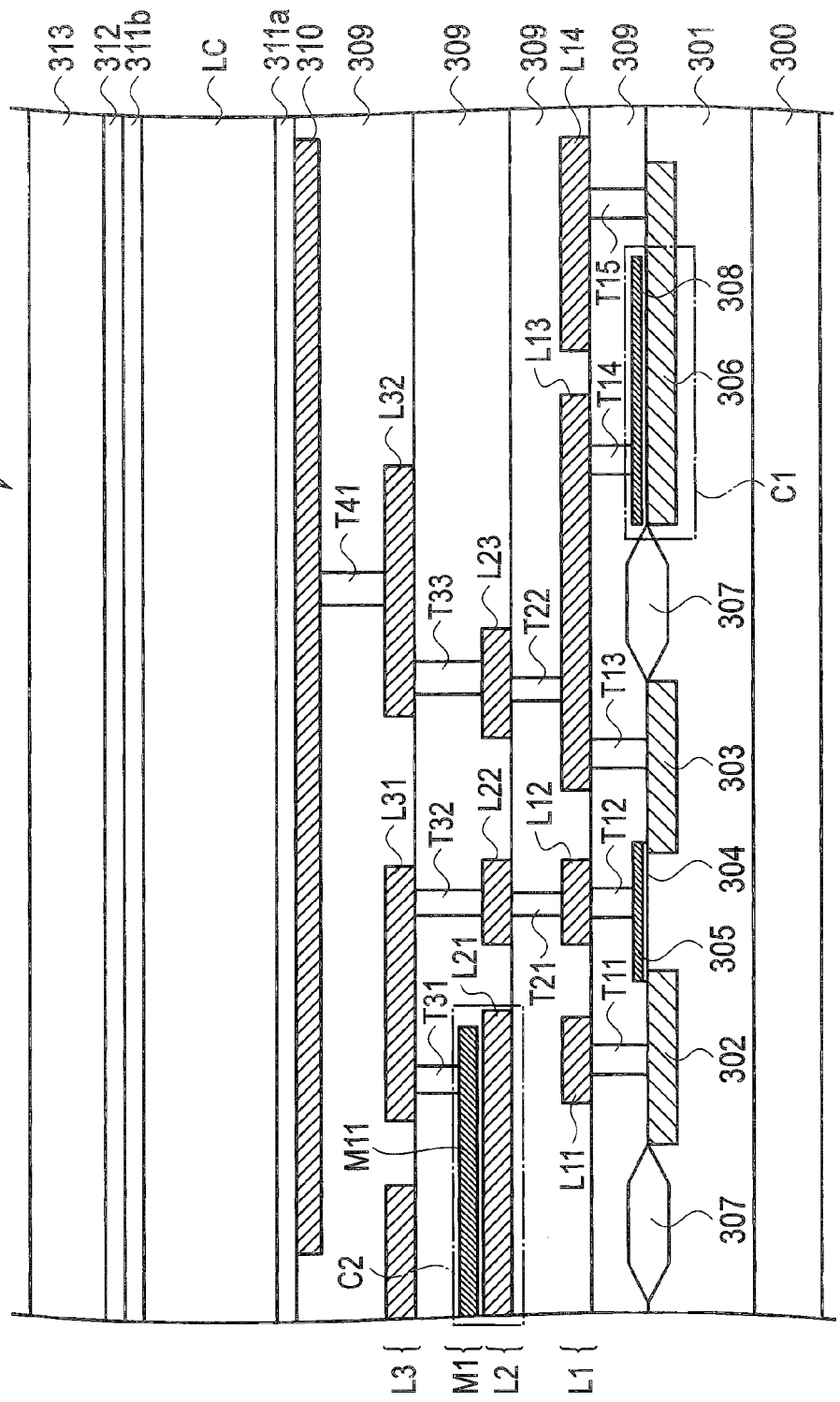
FIG. 3 is a cross-sectional view showing a schematic cross-sectional structure of the pixel circuit in the liquid crystal display device according to the first embodiment.

FIG. 3 is a cross-sectional view showing a schematic cross-sectional structure of the pixel circuit 11 in the liquid crystal display device 1 according to the first embodiment.

In FIG. 3, for example, on a semiconductor substrate 300 made of a silicon substrate, a well region 301 is formed. In the well region 301, the transistor Tr shown in FIG. 2 is formed. In a case where the transistor Tr is composed of an N-channel FET, the well region 301 becomes a P-type well region.

In the well region 301, diffusion layers 302 and 303 in which impurities are diffused are formed so as to be spaced apart from each other by a predetermined distance. In the case where the transistor Tr is composed of the N-channel FET, N-type impurities, for example, such as boron are implanted and diffused in the diffusion layers 302 and 303.

On the well region 301 between the diffusion layer 302 and the diffusion layer 303, polysilicon 305 is formed through a silicon oxide film 304 that becomes a gate oxide film. In such a way, the transistor Tr is formed so that the diffusion layer 302 is a drain region, that the diffusion layer 303 is a source region, and that the polysilicon 305 is a gate electrode.

Moreover, in the well region 301, the diffusion layer 306 into which the impurities are diffused is formed so as to be spaced apart from the diffusion layer 303 by a predetermined distance while sandwiching an element isolation region 307 between the diffusion layers 303 and 306, the element isolation region 307 being formed adjacent to the diffusion layer 303.

On the well region 301, an interlayer insulating film 309, for example, such as a silicon oxide film is formed. Inside of the interlayer insulating film 309 on the diffusion layer 306, polysilicon 308, which is the same as that composing the gate electrode of the transistor Tr, is formed. The polysilicon 308 sandwiches a part of the interlayer insulating film 309 between the polysilicon 308 and the diffusion layer 306.

The polysilicon 308 composes the first electrode portion of the holding capacitance portion C1, and the diffusion layer 306 composes the second electrode portion of the holding capacitance portion C1. Hence, the holding capacitance portion C1 is composed of an MIS structure where the interlayer insulating film 309 that becomes a dielectric, is sandwiched between the polysilicon 308 and the diffusion layer 306.

Note that the pixel circuit 11 shown in FIG. 3 is electrically isolated from a pixel circuit 11 (not shown), which is adjacent thereto, by the element isolation region 307 formed so as to be adjacent to the diffusion layer 302.

On the semiconductor substrate 300, a multilayer wiring structure is constructed. In this multilayer wiring structure, a first wiring layer L1, a second wiring layer L2 and a third wiring layer L3 are formed in order from the semiconductor substrate 300 toward the upper side. The first wiring layer L1 to third wiring layer L3 are composed of metal, for example, such as aluminum and copper. Respective wiring layers, which are the first wiring layer L1 to the third wiring layer L3, are insulated from one another by interlayer insulating films 309 as mentioned above.

The first wiring layer L1 includes a first wiring portion L11, a second wiring portion L12, a third wiring portion L13 and a fourth wiring portion L14. The first wiring portion L11, the second wiring portion L12, the third wiring portion L13 and the fourth wiring portion L14 are electrically isolated from one another by the interlayer insulating film 309.

The first wiring portion L11 of the first wiring layer L1 is bonded to the diffusion layer 302, which becomes the drain region of the transistor Tr, through a through hole T11 formed in the interlayer insulating film 309. The second wiring portion L12 of the first wiring layer L1 is bonded to the polysilicon 305, which becomes the gate electrode of the transistor Tr, through a through hole T12 formed in the interlayer insulating film 309.

The third wiring portion L13 of the first wiring layer L1 is bonded to the diffusion layer 303, which becomes the source region of the transistor Tr, through a through hole T13 formed in the interlayer insulating film 309. The third wiring portion L13 is bonded to the polysilicon 308, which becomes the first electrode portion of the holding capacitance portion C1, through a through hole T14 formed in the interlayer insulating film 309.

The fourth wiring portion L14 of the first wiring layer L1 is bonded to the diffusion layer 306, which becomes the second electrode portion of the holding capacitance portion C1, through a through hole T15 formed in the interlayer insulating film 309.

The second wiring layer L2 includes a first wiring portion L21, a second wiring portion L22 and a third wiring portion L23. The first wiring portion L21, the second wiring portion L22 and the third wiring portion L23 are electrically isolated from one another by the interlayer insulating film 309.

The first wiring portion L21 of the second wiring layer L2 composes the fourth electrode portion of the gate capacitance portion C2. For example, the first wiring portion L21 of the second wiring layer L2 is connected to the ground power supply and is given the ground potential. The second wiring portion L22 of the second wiring layer L2 is bonded to the second wiring portion L12 of the first wiring layer L1 through a through hole T21 formed in the interlayer insulating film 309. The third wiring portion L23 of the second wiring layer L2 is bonded to the third wiring portion L13 of the first wiring layer L1 through a through hole T22 formed in the interlayer insulating film 309.

A first metal layer M1 is formed in the interlayer insulating film 309 between the second wiring layer L2 and the third wiring layer L3. The first metal layer M1 is composed of metal, for example, such as titanium nitride (TiN) and titanium (Ti). The first metal layer M1 includes a first electrode portion M11.

The first electrode portion M11 composes the third electrode portion of the gate capacitance portion C2. The first electrode portion M11 is formed opposite to the first wiring portion L21 of the second wiring layer L2 so as to be spaced apart by a predetermined interval. The interlayer insulating film 309 is sandwiched between the first electrode portion M11 and the first wiring portion L21 of the second wiring layer L2.

In such a way, the gate capacitance portion C2 is composed of the MIM structure in which the interlayer insulating film 309 that becomes a dielectric is sandwiched between the first wiring portion L21 of the second wiring layer L2 and the first electrode portion M11 of the first metal layer M1.

Above the first metal layer M1, the third wiring layer L3 is formed. The third wiring layer L3 includes a first wiring portion L31 and a second wiring portion L32. The first wiring portion L31 and the second wiring portion L32 are electrically isolated from each other by the interlayer insulating film 309.

The first wiring portion L31 of the third wiring layer L3 is bonded to the first electrode portion M11 of the first metal layer M1 through a through hole T31 formed in the interlayer insulating film 309. The first wiring portion L31 is bonded to the second wiring portion L22 of the second wiring layer L2 through a through hole T32 formed in the interlayer insulating film 309.

In such a way, the first electrode portion M11 of the first metal layer M1 is connected to the polysilicon 305 through the first wiring portion L31 of the third wiring layer L3, the second wiring portion L22 of the second wiring layer L2, the second wiring portion L12 of the first wiring layer L1 and the through holes T32, T21 and T12. In such a way, the gate electrode of the transistor Tr and the third electrode portion of the gate capacitance portion C2 are connected to each other.

The second wiring portion L32 of the third wiring layer L3 is bonded to the third wiring portion L23 of the second wiring layer L2 through a through hole T33 formed in the interlayer insulating film 309.

Above the third wiring layer L3, a pixel electrode 310 is formed through the interlayer insulating film 309. The pixel electrode 310 is bonded to the second wiring portion L32 of the third wiring layer L3 through a through hole T41 formed in the interlayer insulating film 309.

In such a way, the pixel electrode 310 is electrically connected to the diffusion layer 303, which forms the source region of the transistor Tr, through the first wiring layer L1 to the third wiring layer L3 and the through holes which bond these to one another.

Above the pixel electrode 310, the liquid crystal LC is formed so as to be sandwiched between orientation layers 311a and 311b, which orient initial molecular arrangement of the liquid crystal LC in a predetermined direction.

Above the liquid crystal LC, a common electrode 312 is formed. In such a way, the liquid crystal LC is formed by being filled and sealed between the pixel electrode 310 and the common electrode 312.

Above the common electrode 312, a transparent substrate 313 is formed. In such a way, the pixel circuit 11 is formed so as to be sandwiched between the semiconductor substrate 300 and the transparent substrate 313.

In the above-mentioned laminated structure, incident light, which is made incident from the transparent substrate 313, passes through the liquid crystal LC, and reaches the pixel electrode 310. The incident light, which has reached the pixel electrode 310, is reflected on the pixel electrode 310, passes through the liquid crystal LC one more time, and is emitted from the transparent substrate 313. In this process of the incidence/emission of the light, the incident light is modulated in the liquid crystal LC in response to the signal voltage of the pixel signal, which is applied to the pixel electrode 310, and display corresponding to the pixel signal is performed.

Next follows a description of basic operations of writing the pixel signal to the pixel circuit 11 and driving the liquid crystal LC in the liquid crystal display device 1 with the above-described configuration.

The respective pixel signals corresponding to the respective column data lines (D1 to Dm) are sequentially outputted to the respective switches SW1 to SWm of the switch circuit 15, which correspond thereto, during the period of one horizontal scanning period. In synchronization with timing when the pixel signals are given to the switches SW1 to SWm, the switching signals are sequentially given to the corresponding switches SW1 to SWm.

In such a way, based on the switching signals, the pixel signals given sequentially to the switches SW1 to SWm are selected by the corresponding switches SW1 to SWm. The selected pixel signals are sequentially given to the column data lines corresponding thereto.

In synchronization with the timing when the selected pixel signals are sequentially given to the corresponding column data lines, the row selection signals are sequentially given to the row scanning lines during one vertical scanning period. In such a way, m number of the transistors Tr, in which the gate terminals are connected to the row scanning lines given the row selection signals shift from the non-conducting state to the conducting state.

In such a way, the pixel signals given to the column data lines are written to the holding capacitance portions C1 through the transistors Tr in the conducting state. The pixel signals written to the holding capacitance portion C1 are held in the holding capacitance portions C1 after the transistors Tr shift from the conducting state to the non-conducting state. The pixel signals held in the holding capacitance portions C1 are held in the holding capacitance portions C1 during each period from the timing when a next vertical scanning period starts to the timing when a new pixel signal is written.

Writing operations of the pixel signals, which are as described above, are executed for all of the n pieces of row scanning lines, and pixel signals equivalent to one frame are sequentially written and held in the holding capacitance portions C1 of all of the m×n pieces of pixel circuits 11.

With regard to the pixel signals held in the holding capacitance portions C1, voltages corresponding to the signal voltages of the pixel signals are applied to the pixel electrodes of the liquid crystal LC. The liquid crystal LC is driven in response to each of the potential differences between the voltages, which are applied to the pixel electrodes in response to the signal voltages of the pixel signals, and a common voltage electrode applied to the common electrode of the liquid crystal LC. In such a way, liquid crystal display corresponding to the pixel signals written to the respective pixel circuits 11 is performed.

As mentioned above, such liquid crystal display operations based on the pixel signals are executed in all of the pixel circuits 11, and the pixel signals equivalent to one frame are sequentially written and held into the holding capacitance portions C1 of all of the m×n pieces of the pixel circuits 11, whereby an image equivalent to one frame is displayed on the liquid crystal.

Next follows a description of operations and effects of the liquid crystal display device 1 according to the first embodiment by making comparison between the first embodiment and the prior art that does not adopt the configuration in which the gate capacitance portions are connected to the gate terminals of all of the transistors, the configuration being the technical feature of the first embodiment.

First, a description is made in detail of the defect brought about by the prior art.

As shown in FIG. 2, it is assumed that a parasitic capacitance Cgs is formed between the gate terminal and source terminal S of the transistor Tr. This parasitic capacitance Cgs includes an overlap capacitance formed by overlap between the gate electrode and source region of the transistor Tr, a gate wiring capacitance, a source wiring capacitance and the like.

Figure 4:
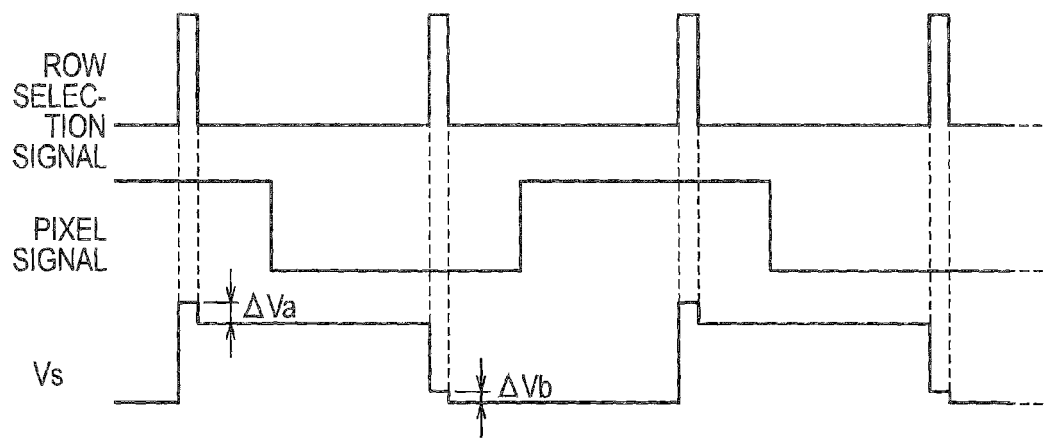
FIG. 4 is a timing chart showing schematic signal waveforms of a variety of signals related to the pixel circuit.

FIG. 4 is a timing chart showing schematic signal waveforms of a variety of the signals related to the pixel circuit 11.

In FIG. 4, the transistor Tr turns to the conducting state during a period while the row selection signal given to the gate terminal of the transistor Tr is at the high level. In such a way, each of the pixel signals given to the column data lines is transferred to the holding capacitance portion C1 through the transistor Tr in the conducting state, and is written to the holding capacitance portion C1.

As a result, a source voltage (Vs) of the source terminal S of the transistor Tr becomes approximately an equivalent voltage to the signal voltage of the pixel signal, which serves as the drain voltage of the transistor Tr. For example, when the source voltage at the time when the transistor Tr is in the non-conducting state is at the low level, and the signal voltage of the pixel signal is at the high level, then the source voltage shifts from low to high.

Thereafter, when the row selection signal shifts from high to low, the transistor Tr shifts from the conducting state to the non-conducting state. In such a way, the signal voltage of the pixel signal is held in the holding capacitance portion C1.

At this time, due to an influence of the parasitic capacitance Cgs, a signal voltage change of the row selection signal, that is, of the gate voltage, causes a crosstalk to the source terminal S. When the crosstalk occurs, the source voltage varies. That is to say, there occurs a so-called gate feed-through in which the source voltage is lowered.

For example, when the gate feed-through occurs after the source voltage shifts from low to high, then as shown in FIG. 4, the source voltage is lowered from the high level by the amount of the gate feed-through voltage ΔVa. Meanwhile, when the gate feed-through occurs after the source voltage shifts from high to low, then as shown in FIG. 4, the source voltage is increased from the low level by the amount of the gate feed-through voltage ΔVb.

As described above, when the source voltage is varied by being lowered or increased, then, following this variation, the voltage applied to the pixel electrode of the liquid crystal LC is varied to cause an offset. In such a way, a flicker and horizontal streak noise occur on the image displayed on the liquid crystal, and image quality degrades.

Figure 5:
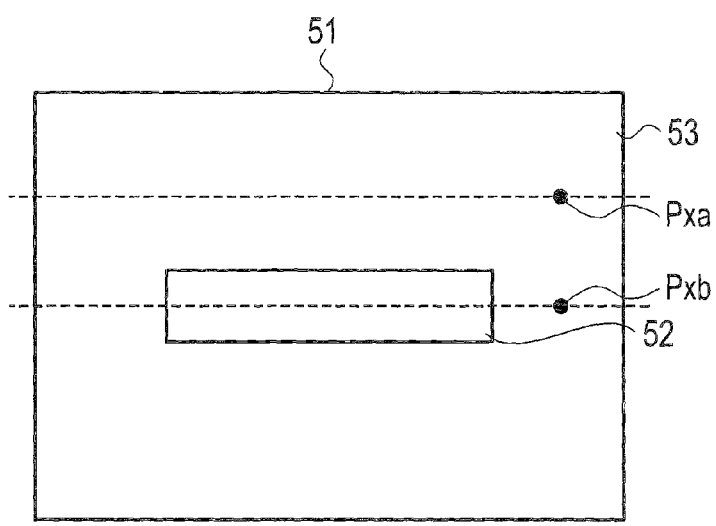
FIG. 5 is a view showing a display example of an image displayed on a liquid crystal display screen.
Figure 6A:
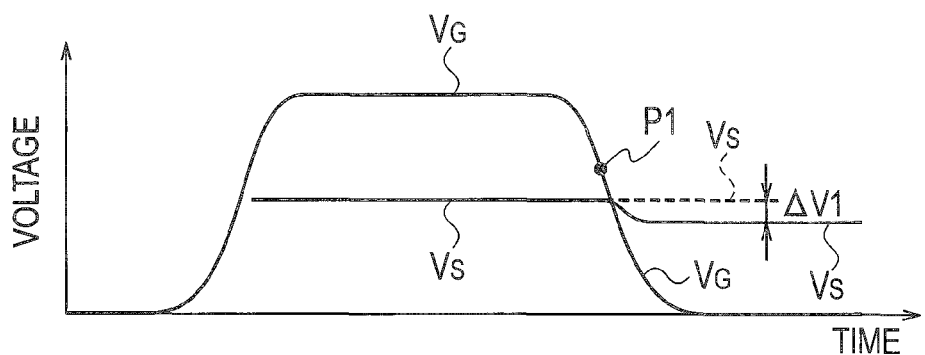
FIG. 6A is a graph schematically showing voltage changes of a gate voltage and a source voltage of a transistor in a pixel circuit connected to a row scanning line that does not pass through a display region of a box pattern.
Figure 6B:
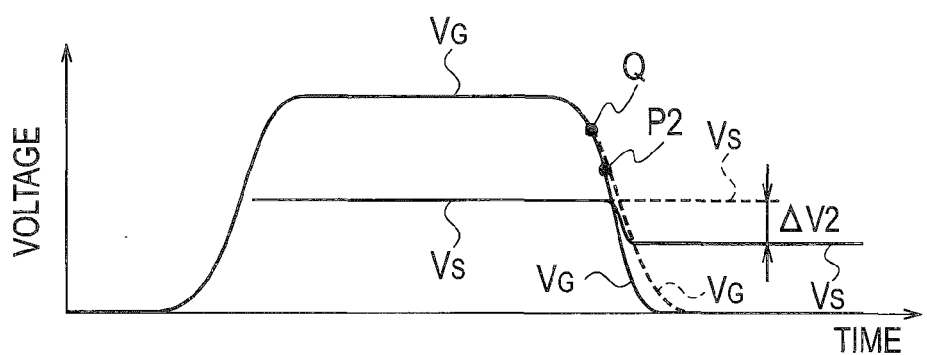
FIG. 6B is a graph schematically showing voltage changes of a gate voltage and a source voltage of the transistor in a pixel circuit connected to a row scanning line that passes through the display region of the box pattern.
Figure 7:
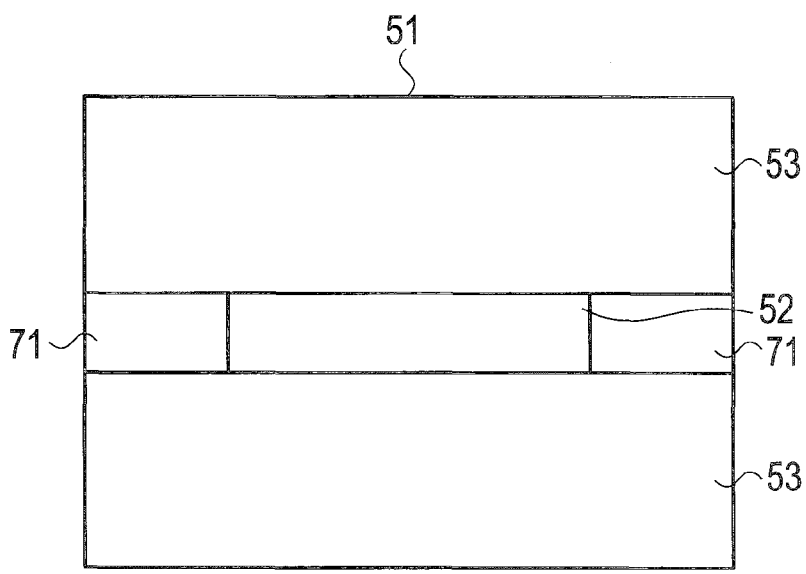
FIG. 7 is a view showing an example of an image in which horizontal streak noise appears in an image displayed on the liquid crystal display screen.

Next, referring to FIG. 5-FIG. 7, a description is made of a mechanism in which the above-mentioned horizontal streak noise occurs on the image displayed on the liquid crystal.

The horizontal streak noise occurs in a unit of one row scanning line in a direction of the row scanning lines in response to a pattern of the liquid crystal display image and to a distribution of gradation of display colors in the image displayed on the liquid crystal.

Accordingly, an image such as liquid crystal display image shown in FIG. 5 is assumed here. In FIG. 5, in a liquid crystal display screen 51, it is assumed that, for example, a white and rectangular box pattern 52 is displayed on a center portion of the liquid crystal display screen 51, and that a display region 53 on a periphery of the box pattern 52 is displayed with gray on the liquid crystal.

On the liquid crystal display screen 51 as described above, among the plurality of pixels which compose the display region 53, a representative of pixels composed of the pixel circuits 11 connected to such row scanning lines which do not pass through a display region of the box pattern 52 is defined to be a pixel Pxa. Moreover, among the plurality of pixels which compose the display region 53, a representative of pixels composed of the pixel circuits 11 connected to such row scanning lines which pass through the display region of the box pattern 52 are defined to be the pixel Pxb.

FIG. 6A is a view schematically showing voltage changes of the gate voltage (Vg) and source voltage (Vs) of the transistor Tr in the pixel circuit 11 that composes the pixel Pxa. FIG. 6B is a view schematically showing voltage changes of the gate voltage (Vg) and source voltage (Vs) of the transistor Tr in the pixel circuit 11 that composes the pixel Pxb.

All of the pixel circuits 11, which are equivalent to one row and are connected to the row scanning line connected to the pixel circuit 11 that composes the pixel Pxa, apply the pixel signals to the pixel electrodes of the liquid crystal LC so that the display color of the display image becomes gray. Hence, in all of the pixel circuits 11, which are equivalent to one row and are connected to the row scanning line connected to the pixel circuit 11 that composes the pixel Pxa, all of the source voltages of the transistors Tr are the same voltage.

In such a way, as shown in FIG. 6A, the transistors Tr of all of the pixel circuits 11, which are equivalent to one row and are connected to the row scanning line connected to the pixel circuit 11 that composes the pixel Pxa, equally shift from the conducting state to the non-conducting state at a transition point P1 of a drop of the gate voltage. At this time, if it is assumed that the source voltage is at the high level, then as shown in FIG. 6A, the source voltage is lowered by the above-mentioned gate feed-through voltage ΔV1.

Among pixel circuits 11, which are equivalent to one row and are connected to the row scanning line connected to the pixel circuit 11 that composes the pixel Pxb, the pixel circuit 11 that composes the pixel Pxb applies the pixel signal to the pixel electrode of the liquid crystal LC so that the display color of the display image becomes gray. Meanwhile, the pixel circuits 11, which compose the pixels in the box pattern 52, apply the pixel signals to the pixel electrodes of the liquid crystal LC so that the display color of the display image becomes white.

Hence, the source voltage of the transistor Tr differs between the pixel circuit 11 that composes the pixel Pxb and the pixel circuits 11 which compose the pixels in the box pattern 52. That is, the source voltage of each of the transistors Tr of the pixel circuits 11 which compose the pixels in the box pattern 52 is higher than the source voltage of the transistor Tr of the pixel circuit 11 that composes the pixel Pxb.

Therefore, the transistors Tr of all of the pixel circuits 11, which are equivalent to one row and are connected to the row scanning line connected to the pixel circuit 11 that composes the pixel Pxb, do not equally shift from the non-conducting state to the conducting state at the drop of the gate voltage.

That is, as shown in FIG. 6B, first, each of the transistors Tr of the pixel circuits 11, which compose the pixels in the box pattern 52, shifts from the conducting state to the non-conducting state at a transition point Q of the drop of the gate voltage. Thereafter, as shown in FIG. 6B, as the gate voltage is being lowered, the transistor Tr of the pixel circuit 11 that composes the pixel Pxb shifts from the conducting state to the non-conducting state at a transition point P2 of the drop of the gate voltage. Note that the gate voltage at the transition point P2 is the same voltage as the gate voltage at the transition point P1 shown in FIG. 6A.

At this time, if it is assumed that the source voltage is at the high level, then as shown in FIG. 6B, the source voltage of the transistor Tr of the pixel circuit 11 that composes the pixel Pxb is lowered by a gate feed-through voltage ΔV2.

Here, in a case where each transistor Tr is composed, for example, of a MOS-FET, a gate capacitance of the transistor Tr is dependent on the gate voltage. Therefore, the gate capacitance of the transistor Tr is represented as a capacitance obtained in such a manner that a capacitance of the gate oxide film and a capacitance of a depletion layer formed in the channel region are connected in series to each other in the depletion layer region and inversion layer region of the transistor Tr.

When the above-mentioned point is considered, if each of the transistors Tr of the pixel circuits 11 which compose the pixels in the box pattern 52 shifts to the non-conducting state in advance, then the gate capacitance of the transistor Tr is decreased. In such a way, a load capacitance of the row scanning line to which the gate terminal of the transistor Tr is connected is also decreased. The decrease of the gate capacitance of the transistor Tr is caused by the fact that the depletion layer is formed and that supply of carriers from the source region to the inversion layer is cut off.

When the load capacitance of the row scanning line is decreased, then with regard to the gate voltage of the transistor Tr of the pixel circuit 11 that composes the pixel Pxb, steepness of a voltage transition becomes larger in comparison with that of the gate voltage of each of the transistors Tr of the pixel circuits 11 which compose the pixels in the box pattern 52. That is, in FIG. 6B, with regard to the gate voltage of the transistor Tr of the pixel circuit 11 that composes the pixel Pxb, the gate voltage being shown by a solid line, a drop of the gate voltage concerned becomes steeper in comparison with that of the gate voltage of each of the transistors Tr of the pixel circuits 11 which compose the pixels in the box pattern 52, the gate voltage being shown by a broken line.

In such a way, the gate feed-through voltage $\Delta V2$ shown in FIG. 6B becomes larger than the gate feed-through voltage $\Delta V1$ shown in FIG. 6A. That is, the source voltage of the transistor Tr of the pixel circuit 11 differs between the pixel Pxa and the pixel Pxb, and the voltages applied to the pixel electrodes of the liquid crystal LC differ among them.

As a result, on the liquid crystal display screen 51, between the pixel Pxa and the pixel Pxb, which should originally display the same gray, a brightness difference occurs in response to a voltage difference between the gate feed-through voltages. That is, as shown in FIG. 7, brightness of display images on the display regions 53 which take the pixel Pxa as a representative pixel and brightness of display images on display regions 71 which take the pixel Pxb as a representative pixel differ from each other. In such a way, the image color of the displayed image differs between the display regions 53 and the display regions 71, and this difference appears as the horizontal streak noise (streaking) of the displayed image on the liquid crystal display screen 51.

In the first embodiment, for the defect as described above, there is adopted such a technical feature that the gate capacitance portions C2 are provided for the gate terminals of the transistors Tr in all of the pixel circuits 11. The gate capacitance portions C2 are composed of the fixed capacitances, and accordingly, can compose capacitances, each of which does not depend on the change of the gate capacitance, that is, the change of the transistor Tr between the conduction and the non-conduction.

Moreover, it becomes possible to approximately uniform the distribution of the load capacitance in the row scanning line, to which the gate terminals of the transistors Tr are connected, over the whole region of the row scanning line, in comparison with a configuration in which the capacitance and resistance are concentrated in one point such as an end portion of the row scanning line.

In such a way, the transistors Tr of all of the pixel circuits 11, which are equivalent to one row and are connected to the same row scanning line, become capable of approximately equalizing the gradients of the signal waveforms at the time of the rise or drop of the gate voltages. As a result, the transistors Tr of all of the pixel circuits 11, which are equivalent to one row and are connected to the same row scanning line, shift from the conducting state to the non-conducting state and from the non-conducting state to the conducting state relatively uniformly in response to the transition of the gate voltage, which is dropped or risen.

Hence, the voltage difference of the gate feed-through voltage among the pixel circuits 11 connected to one row scanning line becomes smaller in comparison with the conventional case. That is, the voltage difference of the source voltage of the transistor Tr among the pixel circuits 11 connected to one row scanning line becomes smaller in comparison with the conventional case, and the voltage difference among the voltages applied to the pixel electrodes of the liquid crystal LC also become smaller in comparison with the conventional case.

In such a way, the brightness difference of the liquid crystal LC is decreased, and the horizontal streak noise, which is a main cause of the degradation of the image quality, is reduced in comparison with the conventional case. As a result, the liquid crystal display device 1 according to the first embodiment can enhance the effect of suppressing the degradation of the image quality of the liquid crystal display image in comparison with the conventional case.

In the first embodiment, the gate capacitance portion C2 is formed to have the MIM structure.

Here, an examination is made of a case where the gate capacitance portion C2 is formed to have the MIS structure in a similar way to the holding capacitance portion C1.

In a case where the gate capacitance portion is composed of the above-mentioned MIS structure, then it is necessary to electrically isolate the diffusion layer, which forms the drain region or source region of the transistor, from the diffusion layer that composes the first electrode portion of the gate capacitance portion. Therefore, the element isolation region is required to electrically isolate the diffusion layer of the transistor and the diffusion layer of the gate capacitance portion from each other, and this element isolation region is formed in the well region in which the diffusion layer is formed.

Therefore, with regard to the pixel circuit including the gate capacitance portion in addition to the transistor and the holding capacitance portion, the configuration thereof is increased in size, and accordingly, in such a liquid crystal display device in which a pixel pitch is highly dense, it has been extremely difficult to compose the gate capacitance portion with the MIS structure. Meanwhile, in the case where the gate capacitance portion is formed having the MIS structure, it becomes difficult to increase the density of the pixel pitch, bringing a defect in that the configuration of the liquid crystal display device is increased in size.

Moreover, in the case where the gate capacitance portion is composed of the MIS structure, both the first electrode portion of the gate capacitance portion and the source region of the transistor are formed in the diffusion layer, and accordingly, a capacitance value of the parasitic capacitance is increased in comparison with the case where the gate capacitance portion is composed of the MIM structure.

Here, with regard to the parasitic capacitance and the holding capacitance portion, since the transistor is connected in series to the gate terminal, the gate feed-through voltage is determined by a capacitance ratio of the parasitic capacitance and the holding capacitance when the transistor shifts from the conducting state to the non-conducting state. In such a way, the gate feed-through voltage is increased as the capacitance value of the parasitic capacitance becomes larger.

Hence, in the case where the gate capacitance portion is formed having the MIS structure, the parasitic capacitance is increased in comparison with the case where the gate capacitance portion is formed having the MIM structure, and accordingly, the gate feed-through voltage is increased. As a result, the case where the gate capacitance portion is formed having the MIS structure is disadvantageous from a viewpoint of reducing the gate feed-through voltage.

In contrast, according to the first embodiment, the gate capacitance portion C2 is formed having the MIM structure, and accordingly, this can contribute to the reduction of the gate feed-through voltage.

Second Embodiment

A description is made below of a configuration of a liquid crystal display device according to a second embodiment with reference to FIG. 8.

The second embodiment is different from the first embodiment mainly in that a holding capacitance portion C3, which is connected in parallel to the holding capacitance portion C1 of the first embodiment, is newly provided. That is, a feature of the second embodiment is that the holding capacitance portion is composed by connecting the holding capacitance portion C1 and the holding capacitance portion C3 in parallel to each other. Here, the holding capacitance portion C1 composes a first holding capacitance portion, and the holding capacitance portion C3 composes a second holding capacitance portion.

Note that, in the second embodiment, configurations other than the holding capacitance portion C3 and operations of the liquid crystal display device are similar to those of the first embodiment, and accordingly, a description thereof is omitted. Hence, here, a description is mainly made of the holding capacitance portion C3.

Figure 8:
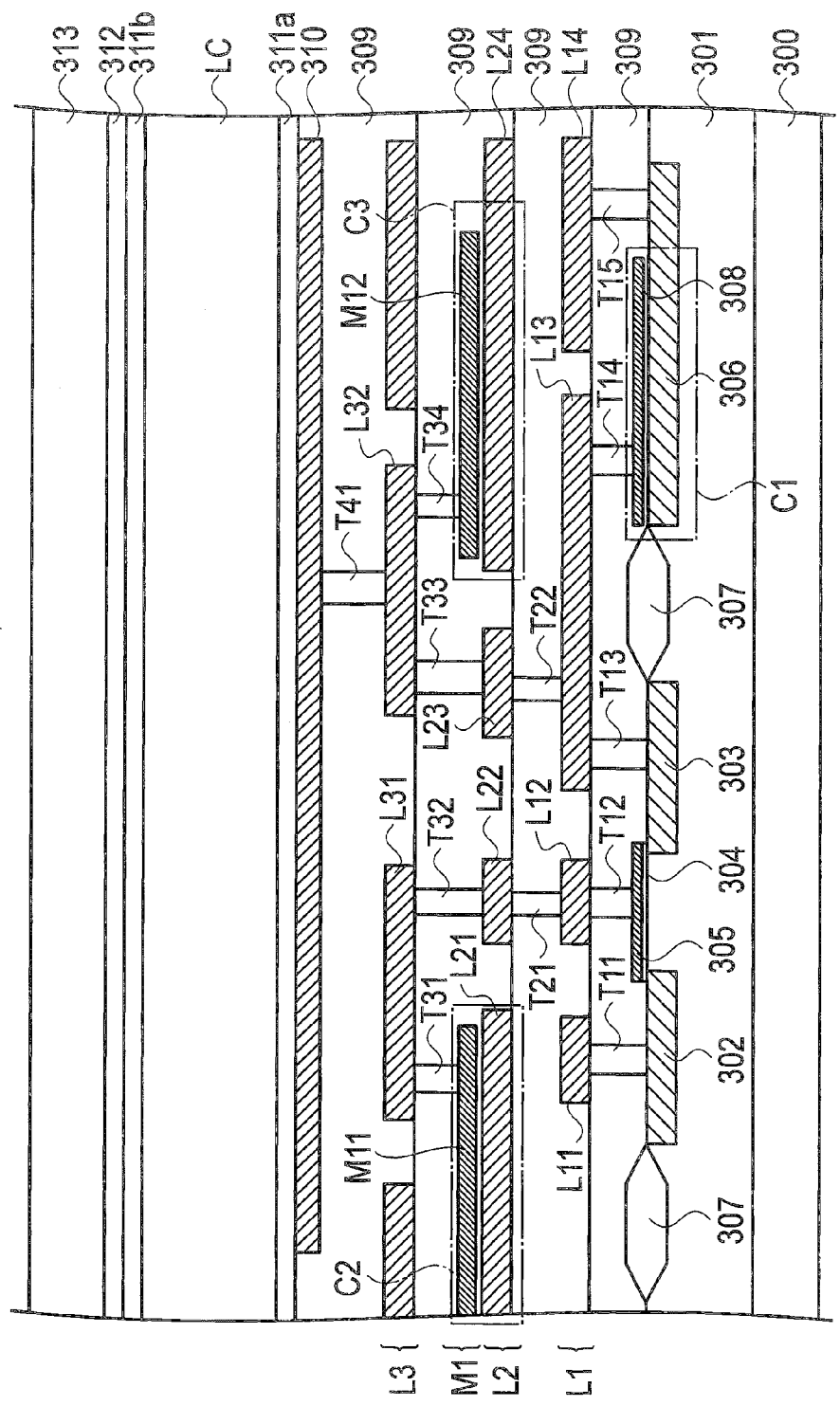
FIG. 8 is a cross-sectional view showing a schematic cross-sectional structure of a pixel circuit in a liquid crystal display device according to the second embodiment.

FIG. 8 is a cross-sectional view showing a schematic cross-sectional structure of a pixel circuit 11 in a liquid crystal display device 1 of the second embodiment. Note that, in FIG. 8, those denoted by the same reference numerals as those in FIG. 3 have the same functions, and accordingly, a description thereof is omitted.

In FIG. 8, the second wiring layer L2 includes a fourth wiring portion L24 in addition to the first wiring portion L21, the second wiring portion L22 and the third wiring portion L23. The first wiring portion L21, the second wiring portion L22, the third wiring portion L23 and the fourth wiring portion L24 are electrically isolated from one another by the interlayer insulating film 309.

The fourth wiring portion L24 of the second wiring layer L2 composes one electrode portion of the holding capacitance portion C3. For example, the fourth wiring portion L24 of the second wiring layer L2 is connected to the ground power supply and is given the ground potential.

The first metal layer M1 includes a second electrode portion M12 in addition to the first electrode portion M11. The second electrode portion M12 composes the other electrode portion of the holding capacitance portion C3. The second electrode portion M12 is formed opposite to the fourth wiring portion L24 of the second wiring layer L2 so as to be spaced apart therefrom by a predetermined interval. The interlayer insulating film 309 is sandwiched between the second electrode portion M12 and the fourth wiring portion L24 of the second wiring layer L2.

In such a way, the holding capacitance portion C3 is composed of the MIM structure in which the interlayer insulating film 309 that becomes a dielectric is sandwiched between the fourth wiring portion L24 of the second wiring layer L2 and the second electrode portion M12 of the first metal layer M1.

The second electrode portion M12 of the first metal layer M1 is bonded to the second wiring portion L32 of the third wiring layer L3 through the through hole T34 formed in the interlayer insulating film 309. In such a way, the second electrode portion M12 of the first metal layer M1 is electrically connected to the polysilicon 308 through the second wiring portion L32 of the third wiring layer L3, the third wiring portion L23 of the second wiring layer L2, the third wiring portion L13 of the first wiring layer L1 and the through holes T33, T22 and T14.

That is, the second electrode portion M12 of the first metal layer M1 is electrically connected to the first electrode portion of the holding capacitance portion C1. In such a way, the holding capacitance portion C1 and the holding capacitance portion C3 are connected in parallel to each other, and composes the holding capacitance portion of the pixel circuit 11.

As a result, according to the second embodiment, it becomes possible to increase the capacitance value of the holding capacitance portion that holds the pixel signal, which is written to the pixel circuit 11, in comparison with that in the first embodiment.

Here, with regard to the parasitic capacitance Cgs and the holding capacitance portion, since the transistor Tr is connected in series to the gate terminal, the gate feed-through voltage is determined by the capacitance ratio of the parasitic capacitance and the holding capacitance when the transistor Tr shifts from the conducting state to the non-conducting state. In such a way, the gate feed-through voltage is reduced as the capacitance value of the holding capacitance is becoming larger.

In such a way, in the second embodiment, the gate feed-through voltage can be reduced in comparison with that in the first embodiment, and the variation of the source voltage can be reduced. As a result, according to the second embodiment, the effect of suppressing the deterioration of the image quality of the liquid crystal image can be further enhanced in comparison with that in the first embodiment.

The gate capacitance portion C2 and the holding capacitance portion C3 that composes the second holding capacitance portion are formed of the same MIM structure, and accordingly, can be formed in the second wiring layer L2, which is the same layer, by the same semiconductor manufacturing process. In such a way, according to the second embodiment, it becomes possible to manufacture the liquid crystal display device 1 in a small size with ease even when the holding capacitance portion C3 is added to the pixel circuit 11.

What is claimed is:

1. A liquid crystal display device comprising:
   a plurality of pixel circuits arranged on respective crossing portions of a plurality of column data lines and a plurality of row scanning lines, the column data lines and the row scanning lines crossing at right angles with each other;
   a horizontal scanning circuit configured to supply pixel signals to the column data lines; and
   a vertical scanning circuit configured to supply row selection signals to the row scanning lines,
   wherein each of the pixel circuits includes:
   a pixel portion having a liquid crystal sandwiched between a pixel electrode and a common electrode, in which the liquid crystal is driven in response to a potential difference between a voltage applied to the pixel electrode and a voltage applied to the common electrode, and incident light is modulated in the liquid crystal in response to the potential difference; and
   a drive portion having: a transistor that has a gate terminal connected to the row scanning line, and a drain terminal connected to the column data line, is subjected to a conduction control based on the row selection signal supplied to the row scanning line, and selectively receives the pixel signal supplied to the column data line; a holding capacitance portion that holds the pixel signal selectively received from the column data line through the transistor; and a gate capacitance portion having one electrode portion directly connected to the gate terminal of the transistor, and the other electrode portion given a reference voltage, the drive portion driving the liquid crystal by applying, to the pixel electrode, a voltage corresponding to a signal voltage of the pixel signal held in the holding capacitance portion.

2. The liquid crystal display device according to claim 1, wherein the gate capacitance portion is composed of a structure in which an insulating film formed on a semiconductor substrate is sandwiched between metal layers.

3. The liquid crystal display device according to claim 1,
wherein the holding capacitance portion is composed of a first holding capacitance portion and a second holding capacitance portion,
wherein the first holding capacitance portion is composed of a structure in which an insulating film formed on a semiconductor substrate is sandwiched between a diffusion layer and polysilicon,
and wherein the second holding capacitance portion is composed of a structure in which an insulating film formed on a semiconductor substrate is sandwiched between metal layers.

4. The liquid crystal display device according to claim 3, wherein the gate capacitance portion and the second holding capacitance portion are formed on a same layer on a semiconductor substrate by a same semiconductor manufacturing process.

5. A liquid crystal display device comprising:
a plurality of pixel circuits arranged on respective crossing portions of a plurality of column data lines and a plurality of row scanning lines, the column data lines and the row scanning lines crossing at right angles with each other;
a horizontal scanning circuit configured to supply pixel signals to the column data lines; and
a vertical scanning circuit configured to supply row selection signals to the row scanning lines,
wherein each of the pixel circuits includes:
a pixel portion having a liquid crystal sandwiched between a pixel electrode and a common electrode, in which the liquid crystal is driven in response to a potential difference between a voltage applied to the pixel electrode and a voltage applied to the common electrode, and incident light is modulated in the liquid crystal in response to the potential difference; and
a drive portion having: a transistor that has a gate terminal connected to the row scanning line, is subjected to a conduction control based on the row selection signal supplied to the row scanning line, and selectively receives the pixel signal supplied to the column data line; a holding capacitance portion that holds the pixel signal selectively received from the column data line through the transistor; and a gate capacitance portion having one electrode portion connected to the gate terminal of the transistor, and the other electrode portion given a reference voltage, the drive portion driving the liquid crystal by applying, to the pixel electrode, a voltage corresponding to a signal voltage of the pixel signal held in the holding capacitance portion,
wherein the holding capacitance portion is composed of a first holding capacitance portion and a second holding capacitance portion,
wherein the first holding capacitance portion is composed of a structure in which an insulating film formed on a semiconductor substrate is sandwiched between a diffusion layer and polysilicon,
and wherein the second holding capacitance portion is composed of a structure in which an insulating film formed on a semiconductor substrate is sandwiched between metal layers.

6. The liquid crystal display device according to claim 5, wherein the gate capacitance portion is composed of a structure in which an insulating film formed on a semiconductor substrate is sandwiched between metal layers.

7. The liquid crystal display device according to claim 5, wherein the gate capacitance portion and the second holding capacitance portion are formed on a same layer on a semiconductor substrate by a same semiconductor manufacturing process.

* * * * *